US008671742B2

(12) United States Patent
Ramond

(10) Patent No.: US 8,671,742 B2
(45) Date of Patent: Mar. 18, 2014

(54) HEATER PLUG HAVING A METAL FINGER

(75) Inventor: Alain Ramond, Merville (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 13/520,259

(22) PCT Filed: Jan. 11, 2011

(86) PCT No.: PCT/EP2011/000077
§ 371 (c)(1),
(2), (4) Date: Nov. 16, 2012

(87) PCT Pub. No.: WO2011/085959
PCT Pub. Date: Jul. 21, 2011

(65) Prior Publication Data

US 2013/0047715 A1 Feb. 28, 2013

(30) Foreign Application Priority Data

Jan. 12, 2010 (FR) ...................................... 10 00101

(51) Int. Cl.
*G01M 15/08* (2006.01)

(52) U.S. Cl.
USPC ........................................................ 73/114.18

(58) Field of Classification Search
USPC .......................................... 73/114.18, 114.19
See application file for complete search history.

(56) References Cited

U.S. PATENT DOCUMENTS

| | | | | |
|---|---|---|---|---|
| 6,411,038 | B2 * | 6/2002 | Murai et al. | 315/55 |
| 6,539,787 | B1 * | 4/2003 | Murai et al. | 73/114.21 |
| 7,201,043 | B2 * | 4/2007 | Yamada et al. | 73/114.21 |
| 7,228,730 | B2 * | 6/2007 | Haussner et al. | 73/114.19 |
| 8,250,909 | B2 * | 8/2012 | Kern et al. | 73/114.16 |
| 8,272,256 | B2 * | 9/2012 | Mori et al. | 73/114.18 |
| 8,297,115 | B2 * | 10/2012 | Borgers et al. | 73/114.19 |
| 8,505,511 | B2 * | 8/2013 | Ramond et al. | 123/179.21 |
| 8,519,306 | B2 * | 8/2013 | Itoh et al. | 219/267 |
| 2004/0182145 | A1 * | 9/2004 | Okazaki et al. | 73/119 R |
| 2007/0062267 | A1 | 3/2007 | Boucard et al. | |
| 2007/0163329 | A1 * | 7/2007 | Last et al. | 73/35.12 |
| 2009/0056663 | A1 | 3/2009 | Ramond et al. | |
| 2009/0242540 | A1 * | 10/2009 | Itoh et al. | 219/267 |
| 2010/0079155 | A1 * | 4/2010 | Matsuoka et al. | 324/691 |

FOREIGN PATENT DOCUMENTS

| | | | |
|---|---|---|---|
| DE | 101 30 693 | A1 | 1/2002 |
| DE | 10 2005 061879 | A1 | 7/2007 |
| EP | 1 460 404 | A1 | 9/2004 |
| FR | 2 861 836 | A1 | 5/2005 |
| FR | 2 884 299 | A1 | 10/2006 |

OTHER PUBLICATIONS

International Search Report, dated May 24, 2011, from corresponding PCT application.

* cited by examiner

*Primary Examiner* — Freddie Kirkland, III
(74) *Attorney, Agent, or Firm* — Young & Thompson

(57) ABSTRACT

This heater plug includes:

A tubular body (2),

A finger (4) mounted inside the tubular body (2) and protruding outside the body at one extremity of this body, and A pressure sensor (8), A membrane (28) extending between the body (2) and the finger (4) enabling a relative longitudinal movement between the finger (4) and the body (2). The pressure sensor (8) is arranged between firstly a first bearing part (38) connected via a first tubular part (20, 20') to the finger (4) in the vicinity of the membrane (28) and a second bearing part (40) connected via a second tubular part (22) to the body (2).

15 Claims, 5 Drawing Sheets

HEATER PLUG HAVING A METAL FINGER

The present invention relates to a heater plug incorporating a force sensor to measure pressure inside a cylinder of an internal combustion engine.

In an internal combustion engine, in particular a diesel engine, each cylinder typically includes a heater plug that enables the combustion chamber of said cylinder to be heated, in particular when starting the engine. Such a heater plug is placed in a threaded bore passing through the cylinder head of the engine. It comprises firstly a body having an external thread able to cooperate with an internal thread formed in the bore, and secondly a finger intended to extend into the combustion chamber and in which a heating electrode is seated.

It is known to incorporate a force sensor, usually a piezoelectric sensor, in such a heater plug. Indeed, it has been noted that the knowledge of the pressure value inside each cylinder enables the combustion inside the engine to be controlled better. This information is in particular used to control the fuel injection in each cylinder. The fuel consumption of the engine can then be optimized and pollutant emissions reduced.

This sensor can be placed immediately above the heater finger of the plug.

Document FR-2 884 299 discloses a heater plug having a tubular body with a plug head and a fixing zone for fixing it to a bore, a finger mounted inside the plug at the extremity opposite the plug head and a force sensor. In such a plug, the finger is rigidly attached to the plug body in a connection zone and the plug body has, between the connection zone thereof with the finger and the fixing zone thereof in a bore, an elastically deformable part such that said connection zone is movable and can move longitudinally in relation to the supposedly fixed fixing zone. This elastically deformable part may be obtained by material thinning (in relation to the fixing zone). The force sensor is arranged between firstly an element rigidly connected to the connection zone and secondly a fixed element of the plug.

Thus, the elastically deformable part acts as a membrane which splits the plug body into two parts, a fixed part designed to be mounted in the cylinder head and a movable part subject to the pressure in a cylinder of the engine. This membrane is deformable and the movable part moves longitudinally. This movement, which is a function of the pressure in the cylinder, is then transmitted to the force sensor which can then provide an indication of the pressure exerted on the finger of the plug. The finger, the membrane and the force sensor, inter alia, thus form a force sensor. The movement of the membrane is not affected by the stresses in the cylinder head or in the rest of the plug body. Consequently, the measurement of the force sensor is independent of these stresses.

The heater plug described in document FR-2 884 299 includes a ceramic heater finger. Such fingers have a standard length of 35 mm and an outer diameter of 3.3 mm, i.e. smaller than normal metal heater fingers, which are around 50 mm long and have an outer diameter of around 4 mm.

The dimensions of normal metal heater fingers appear a priori incompatible with the incorporation of such a metal finger in a heater plug similar to the one described in document FR-2 884 299, particularly since the length of the finger protruding into the combustion chamber has to be limited. To address these problems, a new shorter metal heater finger could be designed, but the design and manufacturing costs of such a finger, combined with the probable drop in heating performance thereof, do not encourage this solution to be pursued.

The invention is intended to provide a heater plug with a built-in force sensor, which provides the advantages of the heater plug described in document FR-2 884 299 and which is more suitable for receiving a known standard metal heater finger.

Another objective of the invention is to disclose a heater plug with a built-in force sensor offering improved pressure-measurement reliability and/or accuracy and/or sensitivity compared to known plugs. Preferably, the heater plug will enable an efficient evacuation of the heat coming from the combustion chamber in order to limit the temperature around the pressure sensor. Also advantageously, the vibration of the finger of the plug will not adversely affect the pressure measurements taken by the sensor.

For this purpose, the invention discloses a heater plug comprising:

A tubular body,

A finger mounted inside the tubular body and protruding outside the body at one extremity of this body, and A pressure sensor, A membrane extending between the body and the finger enabling a relative longitudinal movement between the finger and the body.

According to the present invention, the pressure sensor is arranged between firstly a first bearing part connected via a first tubular part to the finger in the vicinity of the membrane and a second bearing part connected via a second tubular part to the body.

The structure of such a plug is entirely innovative. It enables a pressure sensor and the means for transmitting the pressure inside a combustion chamber to the sensor to be incorporated around a metallic finger (diameter 4 mm and length 50 mm). The structure disclosed makes it possible to not use (or hardly use) the finger, or an electrode, also referred to as a core, supplying it with electricity, to transmit the force exerted on this finger by the pressure to which it is subjected.

A preferred embodiment provides for the first tubular part to extend into the second tubular part.

The membrane may be rigidly connected to a first connection zone enabling the membrane to be fixed to the finger, and the first tubular part may be rigidly connected to the finger via a second connection zone less than 10 mm away from the first connection zone, preferably less than 7 mm from the first connection zone. Connecting the first tubular part to the finger in the vicinity of the connection zone between the finger and the second tubular part obviates the elasticity of the finger and limits the loads transmitted to the finger. Ideally, the above distance is zero.

Advantageously, the first tubular part conducts heat less than the second tubular part. In this case, the two tubular parts may be metal circular cylindrical parts, the thickness of the wall of the first tubular part may be between 0.05 mm and 0.2 mm while the thickness of the wall of the second tubular part may be between 0.4 mm and 1 mm.

In a preferred variant, limiting in particular the number of parts, the first tubular part is blocked and welded to the finger at a first extremity, and the second extremity thereof bears the first bearing part assembled freely about an electrode supplying the finger with electricity.

The second tubular part may be welded to the membrane at a first extremity, and the second extremity thereof may bear the second annular bearing part assembled freely about an electrode supplying the finger with electricity. In this case, the second tubular part is for example rigidly connected to the body at the first extremity thereof.

To act on the frequency modes of the finger and to ensure they do not adversely affect the measurement made by the pressure sensor, a filling of a material such as silicone gel may be provided between the pressure sensor, the first bearing part and the second bearing part on one hand and the electrode supplying electricity to the finger on the other. Furthermore, a filling of a synthetic material may be provided to create a seal around an electrode supplying electricity to the finger and around the other conductors coming out of the body.

Finally, the present invention relates to an internal combustion engine, in particular a diesel engine, having a heater plug such as the one described above.

The details and advantages of the present invention are set out in greater detail in the description below, provided with reference to the schematic drawings attached in which:

FIG. 1 is a longitudinal cross section of a plug body according to the present invention, FIG. 2 is a detailed view of FIG. 1 on an enlarged scale with a filling, FIG. 3 is a second detailed view of FIG. 1 on an enlarged scale, FIGS. 4 to 10 are perspective views showing an assembly method for realizing a preferred embodiment of a heater plug according to the present invention, and FIG. 11 is a schematic view showing the transmission of forces to the pressure sensor.

FIG. 1 is a longitudinal cross section of a heater plug according to the present invention. Conventionally, this heater plug comprises a body 2, a finger 4, a core 6 and a piezoelectric sensor 8.

In the remainder of this description, the heater plug is described in a position presenting a substantially vertical longitudinal direction, the finger 4 protruding from the body 2 in the lower part of the plug. Thus, the adjectives "lower" and "upper" or similar used below refer to this position of the plug.

The lower part of the plug is therefore intended to be located in a cylinder of an internal combustion engine and the upper part of the plug, also referred to as the plug head 10, is intended to protrude out of a cylinder head of said internal combustion engine.

In FIG. 1, the body 2 is shown schematically. It is a tubular body. In FIG. 1, it has a circular cylindrical shape. The thread enabling the plug to be screwed into a threaded bore (also not shown) of a cylinder head of an internal combustion engine is not shown here. Conventionally, the plug head 10 also has a part having a section with a hexagonal external contour enabling the plug in a cylinder head to be gripped, screwed and/or unscrewed. Such means are known to the person skilled in the art and reference is for example made here to FIG. 1 of document FR-2 884 299 cited in the preamble and illustrating a plug head having such fixing and gripping means.

The body 2, also sometimes referred to as the envelope, in the area shown in FIG. 1, i.e. in the lower part thereof, has for example a wall thickness of around 0.6 mm.

The lower extremity of the body 2 is prolonged by an annular part 12 the assembly details of which are given below. This annular part 12 has a conical lower edge. This conical extremity 14 is intended to cooperate with a corresponding cone formed in a cylinder head in order to create a seal. When the plug is tightened into the corresponding threaded bore, the conical extremity 14 of the annular part 12 bears against the corresponding cone formed in the cylinder head thereby forming, as a result of the tightening of the plug, an excellent seal between the body of the plug and the cylinder head.

The finger 4 is mounted coaxially in relation to the body 2 and projects from the body 2 and from the annular part 12 thereby forming the lower part of the heater plug. The protruding part of the finger 4 is designed to sit in a combustion chamber of an engine.

This finger 4 is a "conventional" metal heater finger. It includes a resistor 16 placed inside a sheath 18. The resistor 16 is supplied with electricity by the core 6 that extends into the body 2 and exits by the upper part of this body 2.

There are two more tubular parts between the finger 4 and the core 6 on one hand and the body 2 on the other. There is therefore a first tube, hereinafter referred to as the elastic tube 20, and a second tube, hereinafter referred to as the interface 22, about the upper part of the finger 4 and the lower part of the core 6.

FIGS. 1 and 3 show a first embodiment of the elastic tube 20 (a second embodiment being shown in FIG. 5 et seq.).

Figure 1:
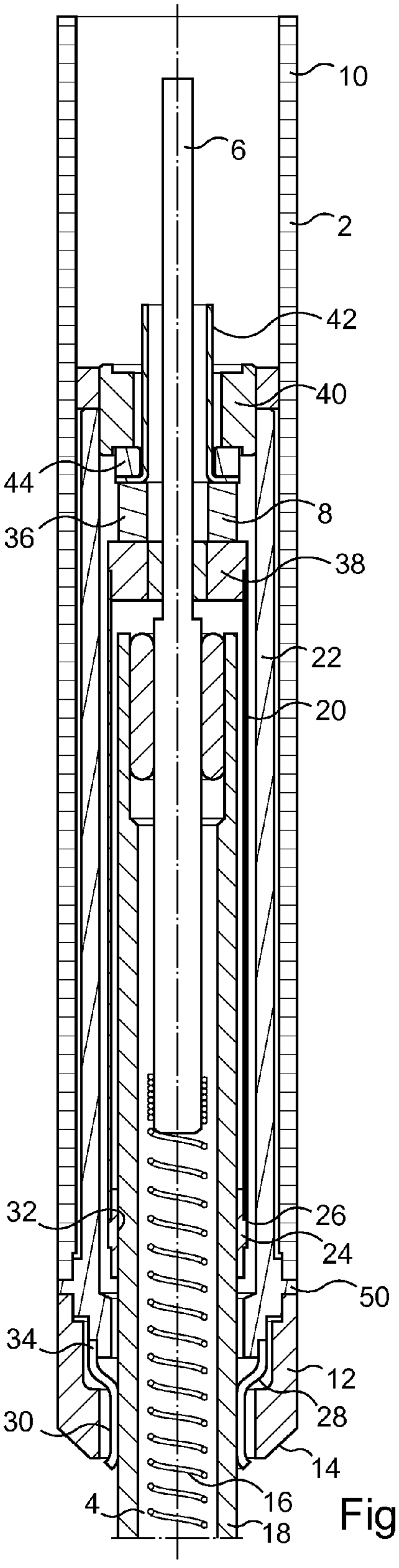
Figure 3:
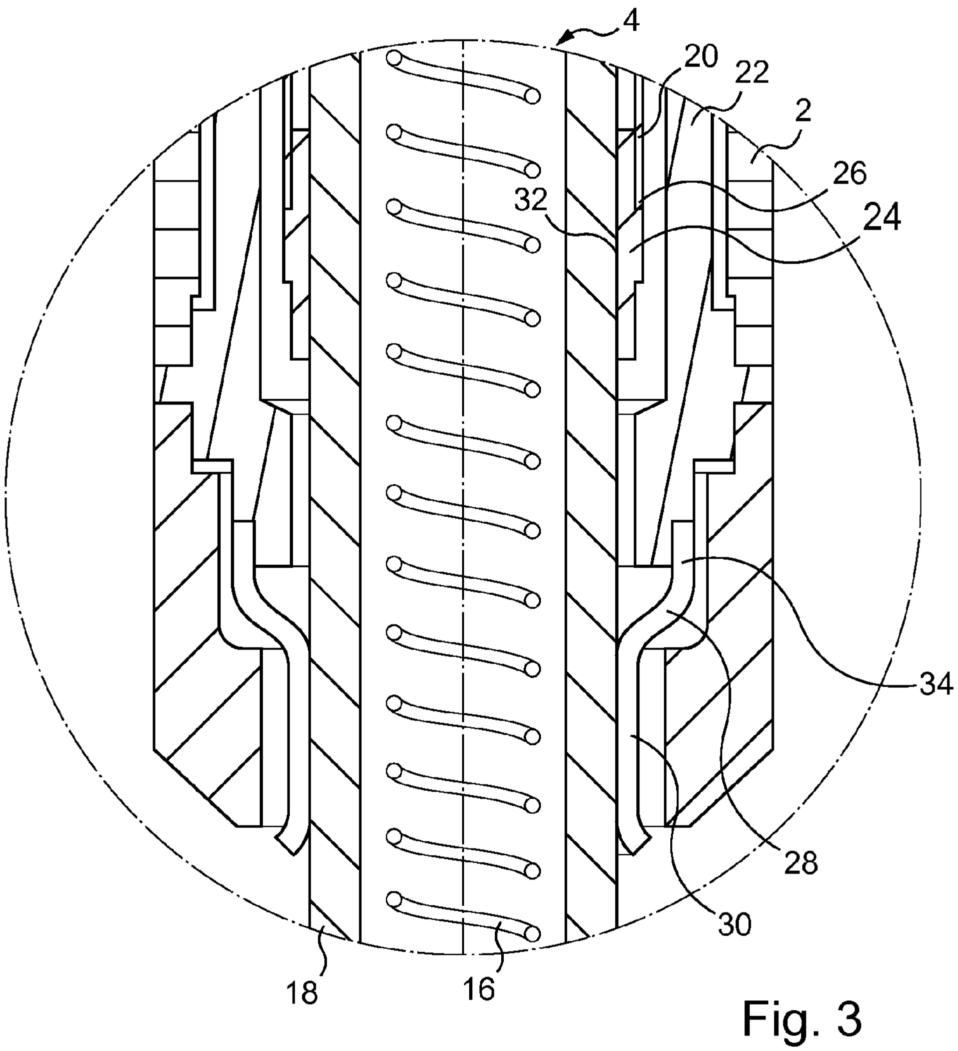
FIG. 3 illustrates the assembly of the elastic tube 20 and of the interface 22 in the lower parts thereof.

In the embodiment in FIGS. 1 and 3, a ring 24 is welded to the sheath 18 of the finger 4. The outer surface of this ring 24 has a shoulder 26 that receives the lower part of the elastic tube 20. This elastic tube 20 bears against the ring 24 and is mounted away from the finger 4 coaxially to this finger. Moreover, the lower edge of the elastic tube 20 and the ring 24 are welded together.

FIGS. 1 and 3 show that the interface 22 is assembled on the finger 4 via a part hereinafter referred to as the membrane 28. This membrane 28 has a circular cylindrical tubular connection zone 30 adapted to the outer surface of the finger 4 such as to enable a force fit of the membrane 28 on the sheath 18 of the finger 4. A laser-beam weld is provided between this first connection zone 30 and the finger 4, or more specifically the sheath 18 of the finger 4.

The zone enabling the connection between the elastic tube 20 and the finger 4 is referred to as the second connection zone 32. In the embodiment in FIGS. 1 and 3, this second connection zone is therefore located level with the ring 24.

A third connection zone is provided to join the membrane 28 to the interface 22. This third connection zone 34 is formed at the level of a circular cylindrical tubular part of the membrane 28. This third connection zone 34 is of greater diameter than the first connection zone 30 and is arranged above the first connection zone 30. The first connection zone 30 is joined to the third connection zone 34 by the membrane itself. This latter has an inflection zone to join the first connection zone 30 to the third connection zone 34.

The membrane itself, on account of the shape thereof and the thickness of the metal sheet used to make it, provides a relative flexibility enabling a movement of the first connection zone 30 in relation to the third connection zone 34, which, as will be shown below, is assumed to be fixed. The flexibility of the membrane itself therefore enables a longitudinal movement of the finger 4 in relation to the body 2, which is also assumed to be fixed.

By way of illustrative example, it can be seen that the relative movement between the first connection zone 30 and the third connection zone 34, when the ring is mounted in an engine, is around 2 μm. More generally, the elasticity of the membrane is such that it enables a movement of the first connection zone 30 in relation to the third connection zone 34 of around 0.01 μm if a pressure of 1 bar is exerted on the finger rigidly connected to the first connection zone 30. More generally, the first connection zone 30 may for example move relative to the third connection zone 34 by between 0.005 μm and 0.02 μm for one bar of pressure exerted on the finger 4.

Figure 2:
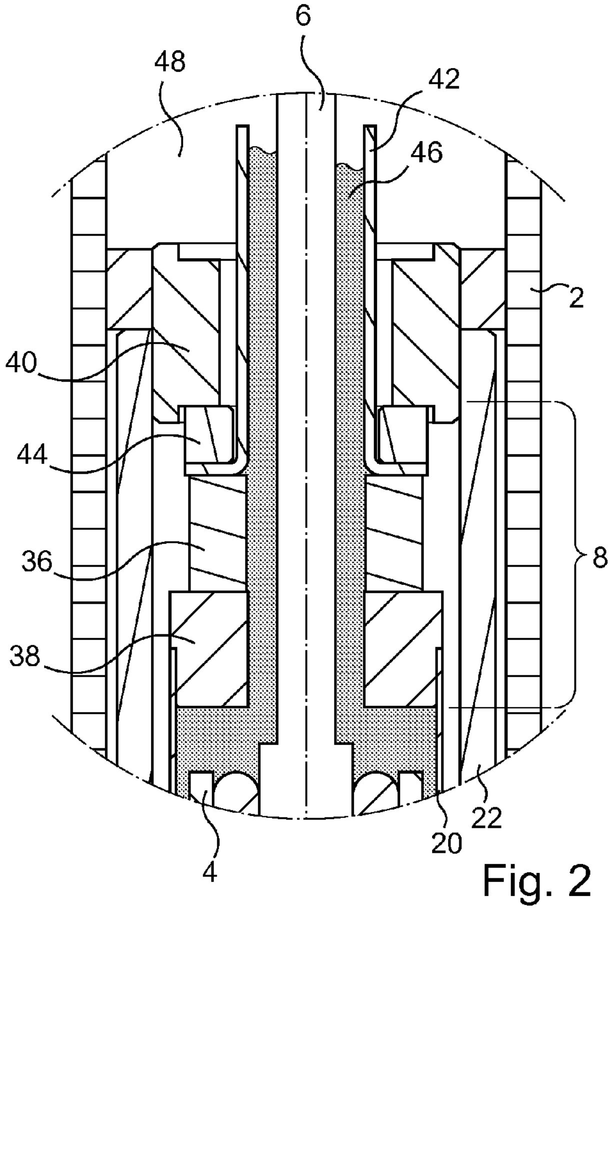

FIG. 2 illustrates the assembly of the piezoelectric sensor 8.

This latter comprises a piezoelectric ceramic 36 assembled between a first retaining ring 38 and a second retaining ring 40.

The first retaining ring 38 is a circular cylindrical ring mounted like a cork at the upper extremity of the elastic tube 20. A shoulder is formed around the periphery of the first retaining ring 38 to enable a perfect positioning of this ring in relation to the elastic tube 20. These two parts are welded together, for example using a laser-beam weld. The first retaining ring 38 is tubular and enables the core 6 to pass freely through the middle thereof.

The piezoelectric ceramic 36 bears directly against the first retaining ring 38. Above the piezoelectric ceramic 36, there is conventionally a contact 42 enabling in particular the recovery of the electric signal provided by the piezoelectric ceramic 36. In this case, the contact 42 is tube-shaped and flared at the lower extremity thereof, the flaring coming into contact with the piezoelectric ceramic 36.

The second retaining ring 40 bears against the contact 42 via a grommet 44.

The second retaining ring 40 has an external diameter that fits the internal diameter of the interface 22 and is mounted inside the upper extremity of this interface 22. The interface 22 and the second retaining ring 40 are welded together, for example using a laser-beam weld. The second retaining ring 40 is prestressed before and during such welding such as to prestress the piezoelectric ceramic 36.

It can be seen here how, compared to most heater plugs fitted with a pressure sensor in the prior art, the forces are not transmitted by the finger 4 and the core in this case. The piezoelectric ceramic 36 is not prestressed by pulling the core 6 or by tightening a nut engaged on the core 6, but by bearing directly on the sensor.

FIG. 2, which illustrates a preferred alternative embodiment of the present invention, shows how a filling is provided around the piezoelectric sensor 8. In the preferred embodiment shown, a silicone gel 46 is poured around the core 6 in particular to fill the free spaces above the finger 4 between the core 6 on one hand and the upper part of the elastic tube 20, the first retaining ring 38, the piezoelectric ceramic 36 and the contact 42 on the other.

In the upper part of the body 2 of the plug, a filling 48 of synthetic material is also provided to create a seal between the body 2 of the heater plug and the conductors coming out of this plug (including the core 6).

To better illustrate a structure of a plug according to the present invention, FIGS. 4 to 10 illustrate a part of a method used to create a preferred embodiment of such a plug.

The method illustrated starts with a finger 4 and the core 6 thereof. As mentioned above, the finger is a metallic finger, as opposed to a ceramic finger. Metal fingers are generally more bulky than ceramic fingers, but have the benefit of being cheaper. An elastic tube 20' is then slipped onto the finger 4. An alternative embodiment is shown here. The elastic tube 20' in fact corresponds to the elastic tube 20 and to the ring 24 in FIGS. 1 and 3. In this case, the elastic tube 20' is restrained at the lower extremity thereof. As a result, in terms of operation, this is exactly the same as the first alternative embodiment described above. The elastic tube 20' is interference fitted to the finger 4 and is welded, for example using a laser-beam weld, to this finger 4.

The membrane 28 is then placed on the finger 4. The first connection zone 30 of this membrane 28 is then welded, for example by laser-beam welding, to the finger 4. This first connection zone 30 is preferably as close as possible to the second connection zone 32 which is at the level of the weld between the elastic tube 20' and the finger 4. Ideally, the first connection zone 30 overlaps the second connection zone 32. Failing this, the distance separating the first connection zone 30 from the second connection zone 32 should be minimized. This distance is for example less than 10 mm, and preferably less than 7 mm. These remarks concerning the relative position between the first connection zone 30 and the second connection zone 32 also apply to the embodiment in FIGS. 1 to 3. In this first embodiment, there is therefore preferably a distance between the first connection zone 30 and the second connection zone 32 of less than 10 mm, and preferably than 7 mm. The distance separating the welds on the finger 4 may be used in this case.

The following stage then involves installing the first retaining ring 38 which is slipped onto the top of the plug about the core 6 to fit into the upper part of the elastic tube 20'. A weld, preferably a laser-beam weld, is then created between the first retaining ring 38 and the elastic tube 20'. The next stage involves installing the interface 22 which bears against the membrane 28 and is welded thereto, for example by laser-beam welding, level with the third connection zone 34. Once the interface 22 is in place, the piezoelectric sensor 8 can be assembled. The piezoelectric ceramic 36, the contact 42, the grommet 44 and the second retaining ring 40 are then slipped in that order onto the core 6. The second retaining ring is assembled inside the interface 22, and it is prestressed downwards, i.e. towards the first retaining ring 38. A weld between the interface 22 and the second retaining ring 40 enables a prestress to be maintained on the piezoelectric ceramic 36.

The drawings do not show installation of the body 2, the annular part 12 or the fillings provided around the plug head 10.

As shown in FIGS. 1 to 3, the lower part of the interface 22 has a peripheral band 50. The body 2 is mounted above this peripheral band 50 and butts against it while the annular part 12 is mounted above this peripheral band 50 and also butts against this band.

The operation of this heater plug with a pressure sensor according to the present invention is described below also with reference to FIG. 11. This latter illustrates very schematically the different elements used to measure the pressure in the cylinder. The pressure to be measured is symbolized by an arrow 52. It is exerted on the finger 4 symbolized here simply by a line. In this case, it is assumed that the cylinder head of the engine is fixed. The heater plug is in contact with this cylinder head level with the thread formed on the outside of the body 2 and the conical extremity 14.

Figure 11:
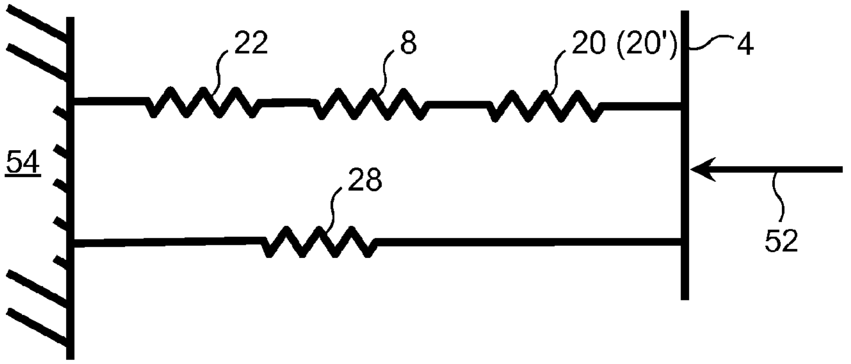
Figure 4:
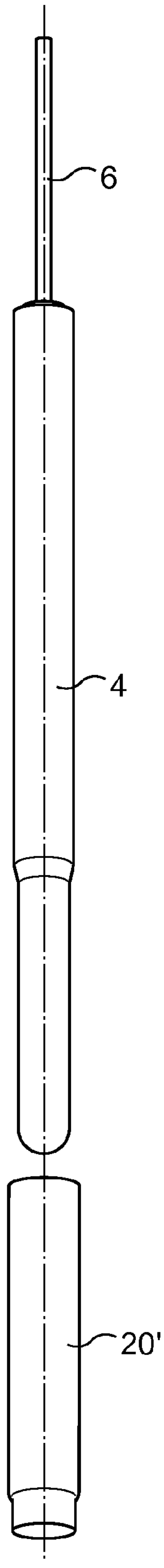
Figure 5:
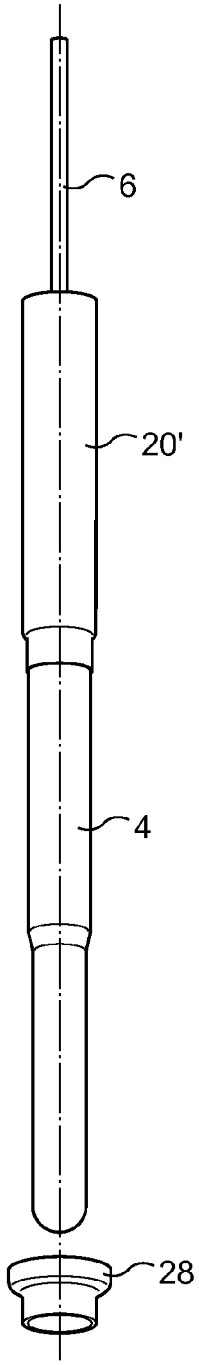
Figure 6:
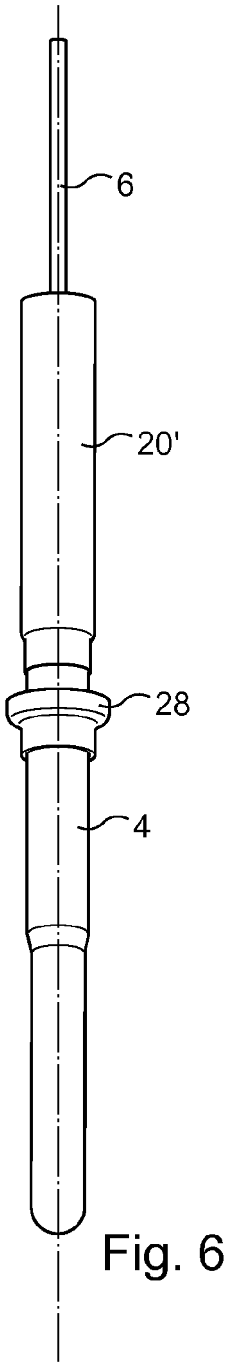
Figure 7:
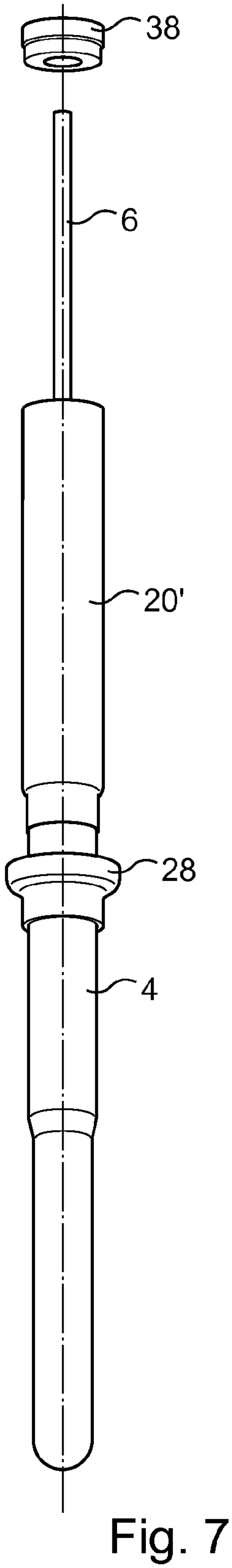
Figure 8:
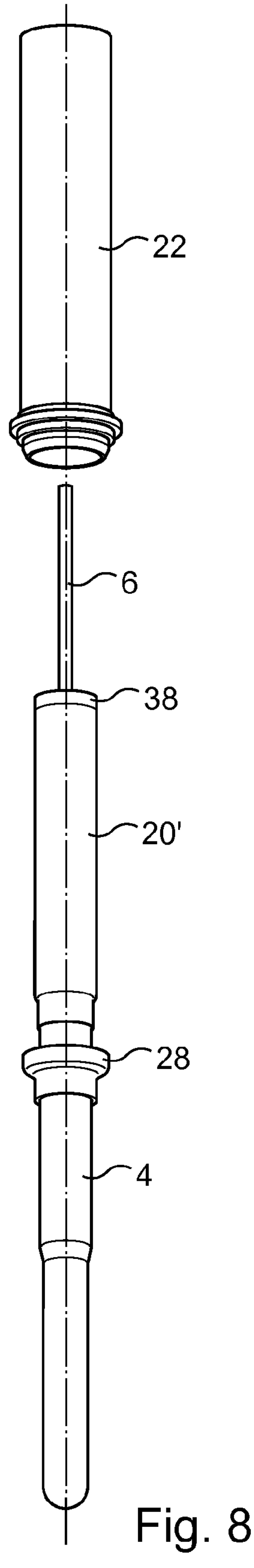
Figure 9:
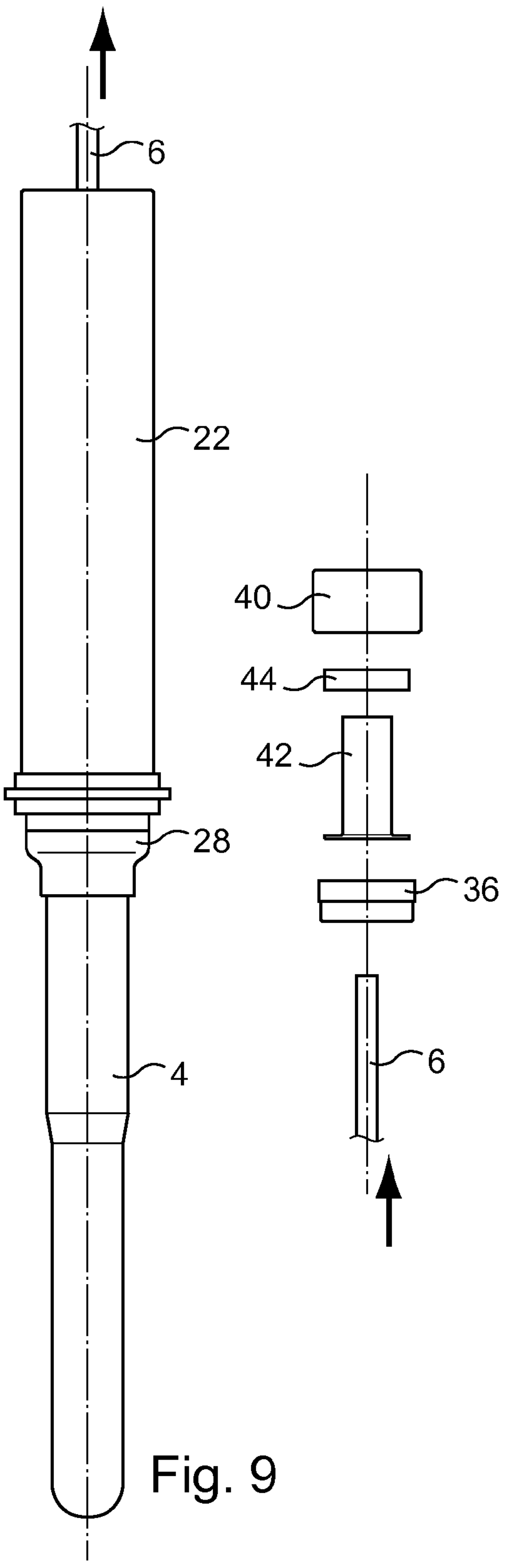
Figure 10:
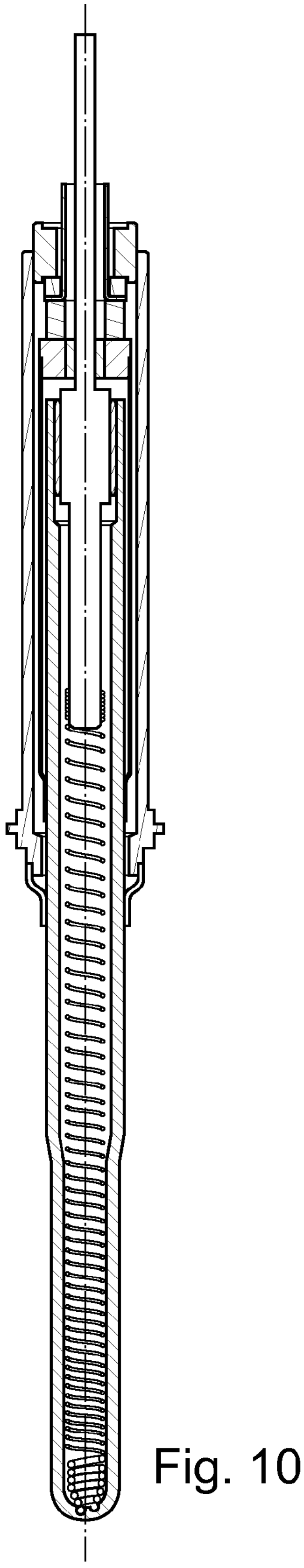

The cylinder head is represented here on the left-hand side of FIG. 11 and is marked with reference 54.

In this case, it is assumed that the body 2 is fixed since no stress is being exerted on it and it is mounted between two fixed zones, specifically the annular part 12 and the thread thereof (not shown). Consequently, the lower part of the interface 22 is fixed just like the third connection zone 34 (due to direct proximity of the body 2).

FIG. 11 also shows a very schematic representation of the elastic tube 20 (or 20'), the piezoelectric sensor 8 and the interface 22. The membrane 28 is also shown on another side of FIG. 11.

FIG. 11 shows that the membrane 28 joins the cylinder head 54 to the finger 4, the third connection zone 34 being rigidly in contact with the cylinder head 54. The interface 22, the piezoelectric sensor 8 and the elastic tube 20 (or 20') are parallel to the membrane 28.

The orders of magnitude below are given by way of non-limiting numerical examples. The following assumptions have been made:

The tube 20 (or 20') has a measurement sensitivity K20 of between 10 and 20 N/μm, The piezoelectric sensor 8 has a measurement sensitivity K8 of between 200 and 250 N/μm, The interface 22 has a measurement sensitivity K22 of between 50 and 100 N/μm, and The membrane 28 has a measurement sensitivity K28 of between 100 and 150 N/μm.

To obtain these values, it is assumed for example that the elastic tube 20 (or 20') has a wall thickness of around 0.1 mm and that the interface 22 has a wall thickness of around 0.5 mm. In this case it is important that the elastic tube 20 (or 20') be thinner than the interface 22.

If it is also assumed that the membrane 28 enables a movement of the first connection zone 30 in relation to the third connection zone 34 of around 0.01 μm per bar of pressure, for a maximum pressure of 200 bars in the combustion chamber, a force of around 30 N may be exerted on the piezoelectric sensor.

A piezoelectric ceramic 36 having a sensitivity of around 20 pC/N ensures a system having a sensitivity of around 3 pC/bar.

The fact of having an elastic tube 20 (or 20') having a thin wall enables the heat conduction of this elastic tube 20 (or 20') to be limited. In the embodiment shown, it is estimated that around 90% of the heat coming from the combustion chamber is evacuated through the membrane 28 to the cylinder head. This protects the piezoelectric sensor 8.

Moreover, with regard to measurement, the prestress exerted on the piezoelectric ceramic 36 is oriented in the opposite direction to the force to be measured. This limits the overall stress on the piezoelectric ceramic 36 when measuring pressure.

The presence of a silicone gel 46 and of the filling 48 enable the modes of resonance of the finger 4 and of the core 6 to be influenced. In this case, it is possible to discard the modes of the passband of the piezoelectric sensor 8 which is usually located below 5 kHz.

The present invention is not limited to the preferred embodiment and the variants thereof described above. It also concerns all of the alternative embodiments available to the person skilled in the art.

So for example, as suggested above, the elastic tube and the membrane could be joined to a single point on the finger of the heater plug.

Just as the ring enabling connection of the elastic tube to the finger of the plug can be removed by modifying the shape of the elastic tube, the membrane could also be incorporated into the interface.

In the embodiment described, it is assumed that the outer envelope of the plug is in two parts, the body and the annular part. A one-piece external envelope could also be used for a plug according to the present invention.

The invention claimed is:

1. A heater plug comprising:

A tubular body (2),

A finger (4) mounted inside the tubular body (2) and protruding outside the body at one extremity of this body, and A pressure sensor (8), A membrane (28) extending between the body (2) and the finger (4) enabling a relative longitudinal movement between the finger (4) and the body (2), the pressure sensor (8) being arranged between firstly a first bearing part (38) connected via a first tubular part (20, 20') to the finger (4) in the vicinity of the membrane (28) and a second bearing part (40) connected via a second tubular part (22) to the body (2), characterized in that the first tubular part (20, 20') extends into the second tubular part (22).

2. The heater plug as claimed in claim 1, characterized in that the membrane (28) is rigidly connected to a first connection zone (30) enabling the membrane (28) to be fixed to the finger (4), and in that the first tubular part (20, 20') is rigidly connected to the finger (4) via a second connection zone (24) arranged less than 10 mm away from the first connection zone (30), preferably less than 7 mm away from the first connection zone (30).

3. The heater plug as claimed in claim 2, characterized in that the first tubular part (20, 20') conducts heat less than the second tubular part (22).

4. The heater plug as claimed in claim 2, characterized in that the first tubular part (20') is blocked and welded to the finger (4) at a first extremity, and in that the second extremity thereof bears the first bearing part (38) mounted freely about an electrode (6) supplying the finger (4) with electricity.

5. The heater plug as claimed in claim 2, characterized in that the second tubular part (22) is welded to the membrane (28) at a first extremity, and in that the second extremity thereof bears the second annular bearing part (40) mounted freely about an electrode (6) supplying the finger (4) with electricity.

6. The heater plug as claimed in claim 2, characterized in that a filling of a material such as silicone gel (46) is added between the pressure sensor (8), the first bearing part (38), the second bearing part (40) on one hand and an electrode (6) supplying the finger (4) with electricity on the other hand.

7. The heater plug as claimed in claim 2, characterized in that a filling (48) of a synthetic material is added to create the seal around an electrode (6) supplying the finger (4) with electricity and around other conductors coming out of the body (2).

8. The heater plug as claimed in claim 1, characterized in that the first tubular part (20, 20') conducts heat less than the second tubular part (22).

9. The heater plug as claimed in claim 8, characterized in that the two tubular parts (20, 20'; 22) are metal circular cylindrical parts, in that the thickness of the wall of the first tubular part (20, 20') is between 0.05 mm and 0.2 mm while the thickness of the wall of the second tubular part (22) is between 0.4 mm and 1 mm.

10. The heater plug as claimed in claim 1, characterized in that the first tubular part (20') is blocked and welded to the finger (4) at a first extremity, and in that the second extremity thereof bears the first bearing part (38) mounted freely about an electrode (6) supplying the finger (4) with electricity.

11. The heater plug as claimed in claim 1, characterized in that the second tubular part (22) is welded to the membrane (28) at a first extremity, and in that the second extremity thereof bears the second annular bearing part (40) mounted freely about an electrode (6) supplying the finger (4) with electricity.

12. The heater plug as claimed in claim 11, characterized in that the second tubular part (22) is rigidly connected to the body (2) at the first extremity thereof.

13. The heater plug as claimed in claim 1, characterized in that a filling of a material such as silicone gel (46) is added between the pressure sensor (8), the first bearing part (38), the second bearing part (40) on one hand and an electrode (6) supplying the finger (4) with electricity on the other hand.

14. The heater plug as claimed in claim 1, characterized in that a filling (48) of a synthetic material is added to create the seal around an electrode (6) supplying the finger (4) with electricity and around other conductors coming out of the body (2).

15. A internal combustion engine, in particular a diesel engine, characterized in that it includes a heater plug according to claim 1.

* * * * *

UNITED STATES PATENT AND TRADEMARK OFFICE

CERTIFICATE OF CORRECTION

PATENT NO. : 8,671,742 B2
APPLICATION NO. : 13/520259
DATED : March 18, 2014
INVENTOR(S) : Alain Ramond It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 57 days.

Signed and Sealed this
Twenty-ninth Day of September, 2015

Michelle K. Lee
*Director of the United States Patent and Trademark Office*